(12) United States Patent
Botero

(10) Patent No.: US 11,138,287 B1
(45) Date of Patent: Oct. 5, 2021

(54) SYSTEM FOR REDUCING SIZE OF TRANSMITTED CONTENT

(71) Applicant: AMAZON TECHNOLOGIES, INC., Seattle, WA (US)

(72) Inventor: Luis Jaime Botero, Austin, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 77 days.

(21) Appl. No.: 16/574,487

(22) Filed: Sep. 18, 2019

(51) Int. Cl.
*G06F 40/143* (2020.01)
*G06F 16/957* (2019.01)
*G06F 16/958* (2019.01)
*G06F 40/146* (2020.01)
*G06F 40/186* (2020.01)

(52) U.S. Cl.
CPC ........ *G06F 16/9574* (2019.01); *G06F 16/958* (2019.01); *G06F 40/143* (2020.01); *G06F 40/146* (2020.01); *G06F 40/186* (2020.01)

(58) Field of Classification Search
CPC .. G06F 16/9574; G06F 40/186; G06F 40/143; G06F 40/146; G06F 16/958; G06F 40/14
See application file for complete search history.

(56) References Cited

U.S. PATENT DOCUMENTS

| | | | | |
|---|---|---|---|---|
| 5,802,518 A | * | 9/1998 | Karaev | ............... G06F 21/31 |
| 6,560,604 B1 | * | 5/2003 | Fascenda | ........... G06F 9/44505 |
| | | | | 707/999.01 |
| 2007/0192324 A1 | * | 8/2007 | Pedersen | ............ G06F 16/9574 |

* cited by examiner

*Primary Examiner* — Keith D Bloomquist
(74) *Attorney, Agent, or Firm* — Lindauer Law, PLLC

(57) ABSTRACT

To reduce the amount of data sent to a device to generate a webpage, a requesting device provides an indication of locally stored templates. Multiple webpages may use similar code represented by a single template. If the requested webpage is associated with a stored template, a response provided to the device includes an indication of the template and webpage code that corresponds to portions of the webpage not included in the template. The requesting device then generates a first portion of the webpage using code in the template and a second portion using the received webpage code. If the requested webpage is associated with a template not indicated in the request, both the template and code that corresponds to the second portion of the webpage are sent. The requesting device then stores the template for future use when accessing the same or a similar webpage associated with the same template.

20 Claims, 8 Drawing Sheets

SYSTEM FOR REDUCING SIZE OF TRANSMITTED CONTENT

BACKGROUND

Webpages and other types of user interfaces may include a large number of elements. In some cases, a significant amount of data, such as hypertext markup language (HTML) code, is transmitted from a server or other source of data to a user device to enable the user device to present a webpage. If the user device is geographically distant from the source of the data or if network conditions are unfavorable for transmission of a large quantity of data, generation of the webpage may be associated with significant latency, which may create a negative user experience.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
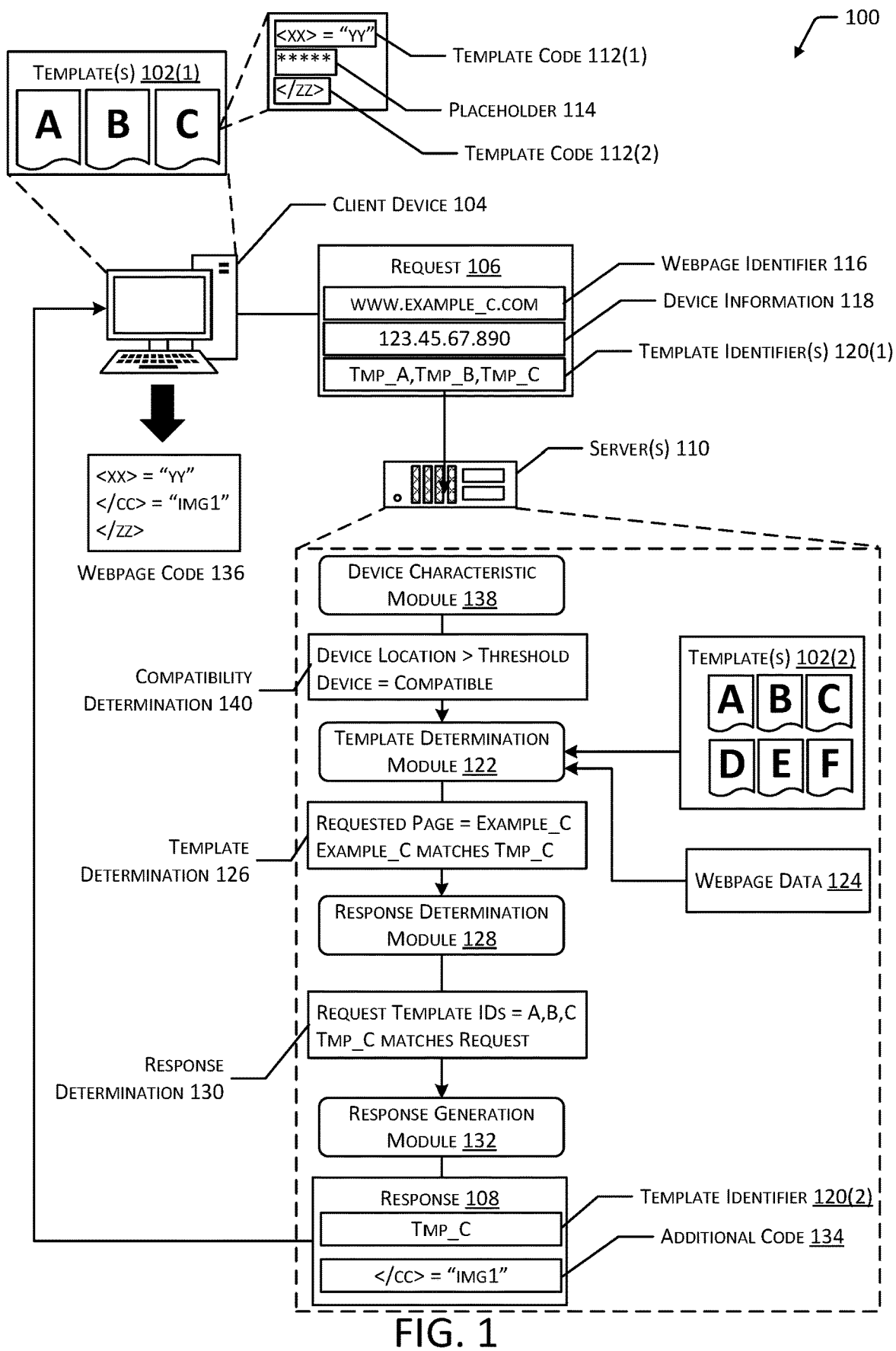
FIG. 1 depicts an implementation of a system for generating a webpage or other type of user interface based in part on one or more templates stored in association with a client device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A webpage or other type of user interface may be presented on a client device by providing data from a server or other source of data to the client device. For example, the client device may provide a request to a server to access a webpage, and the server may provide a response that includes webpage code, such as hypertext markup language (HTML) code, which may cause the client device to present the webpage. The amount of latency that occurs between the request and the response may be affected by a variety of conditions, most notably the geographic location of the client device relative to the server and the amount of data transmitted between the client device and the server. For example, if servers associated with a website are located in a first country and a client device is located in a second country that is thousands of miles away from the first country, requests sent by the client device and responses provided by the severs may both be routed through a large number of computing devices, and the latency associated with both the request and the response may be significant. In such a case, the amount of latency experienced by a user may increase dramatically as the amount of data associated with a webpage increases, because each byte of transmitted data must be transmitted across a significant distance. Existing methods to reduce latency include use of various methods of data compression, transmission of simpler versions of webpages that contain fewer elements, and use of various types of caching that enable a client device to store and reuse cached elements from a previously-visited website on a subsequent visit. However, even when using such techniques, transmission of data associated with a webpage over large distances, such as between locations on different continents, may be affected by latency ranging from 10 to 20 seconds or more.

In some cases, certain HTML code, extensible markup language (XML) code, metadata, or other types of code or data may be common to different webpages. For example, multiple webpages associated with the same website may include code associated with a header that presents a company logo, a search interface, and so forth. Additionally, multiple webpages of the same or similar type may include code that causes certain elements to be positioned in the same locations across multiple webpages. For example, webpages that present information regarding items available for purchase may present an image of the item on a left side of the webpage and text describing the item on a right side of the webpage. In such a case, HTML code that positions an image box or text box at respective locations on the webpages may be common to multiple webpages, while the references to specific images or the specific text to be included in a text box may vary between the webpages.

Described in this disclosure are techniques for determining code that is common to multiple webpages, or other types of user interfaces, and storing this information on a client device as a template. When the client device provides a request to access a webpage, if a template associated with the webpage is stored on the client device, the server or other source of data for the webpage may provide only the webpage code that is not included in the template. The client device may then generate the webpage based on the template, which includes code corresponding to a first portion of the webpage, and the code received from the server, which corresponds to a second portion of the webpage. Using the code associated with the stored template to generate a portion of the webpage may significantly reduce the amount of data sent from the server to the client device when compared to transmission of code associated with the entire webpage, which may significantly reduce latency experienced by a user of the client device.

In addition to identifying a requested webpage, a request sent from the client device may also include information identifying the client device, a user account or user associated with the client device, or characteristics associated with the client device such as hardware or software components of the client device, a location of the client device, and so forth. For example, a geographic location of the client device may be determined based on an IP address or other information included in the request, a location associated with a user account indicated in the request, and so forth. As another example, a determination may be made, based on hardware or software components of the device, whether the device is able to execute scripts or perform other functions to generate webpages using templates. In some cases, the request may also include information indicating one or more metric values associated with communication with the server or other source of the webpage, such as a latency value. In other cases, the server may determine a latency value based on analysis of communication with the client device. If the geographic location of the client device is within a threshold distance of the server or corresponds to one or more threshold locations, if the device is not able to perform the functions necessary to generate webpages using templates, or if the latency or other metric values associated with communication with the client device correspond to one or more threshold values, a response that includes code associated with the entire webpage may be provided to the client device. However, if the geographic location of the client device is determined to be greater than a threshold distance from the server, or if latency or other metric values associated with communication with the client device exceed one or more threshold values, and the device is capable of executing scripts or performing other functions to generate webpages using templates, a determination may be made regarding whether the client device currently stores a template associated with the requested webpage.

For example, the request from the client device may include an indication of one or more template identifiers, each of which corresponds to a template stored in association with the client device. Continuing the example, the request may include or be accompanied by a cookie or other form of data that includes a list of template identifiers. In one implementation, the template identifiers may include a hash code associated with each template stored on the client device. For example, the request may be accompanied by a cookie that includes a list of hash codes, delineated by separators. Representing each template using a unique identifier of limited size, such as a hash code, and transmitting the identifiers in a compact format, such as a list with separators, may enable the templates stored in association with the client device to be communicated to the server while minimizing the amount of data added to the request.

The server may determine the template that is associated with the requested webpage, such as by comparing the HTML or XML code of the webpage with the HTML or XML code for a plurality of templates, to determine a template having code that matches a portion of the code of the webpage. If the template identifier for the determined template does not match the template identifiers provided by the client device, the server may generate a response that includes all of the code used to generate the webpage. For example, the response may include the template associated with the webpage (the template including a first portion of the code used to generate the webpage), and the second portion of the code used to generate the webpage in combination with the template. If the template identifier for the determined template matches one of the template identifiers provided by the client device, the server may generate a response that includes an indication of the determined template, such as the template identifier for the template, and the second portion of the code not included in the template. For example, the template may include code that corresponds to static elements of the webpage, such as headings, titles, search interfaces, and other elements common to multiple webpages of a website, and code associated with the layout of the webpage such as HTML associated with placement of text boxes and image boxes. The second portion of the code may include images, text, and other content unique to the current webpage that may be used in combination with the template to generate the webpage. For example, the second code may represent a differential between the code for the entire webpage and the template, the second code including portions of the code for the webpage that are not already included in the template. The template may include one or more placeholders that indicate locations where portions of the second code may be inserted to generate the webpage.

In some implementations, the response provided to the client device may include a script. The client device may execute the script to generate the template when a response that includes both the template and the second portion of the code is received. For example, portions of the webpage code that are included in the template may include a flag, marker, or other type of indication that may enable these portions of the webpage code to be identified as part of the template. Generation of the template may include storing these portions of the webpage code, along with one or more placeholders indicating locations where the second portion of the code is inserted, as a template for use when the same webpage or a similar webpage associated with the same template is subsequently requested. The script may also be used to generate a webpage based on the stored template and received code. For example, the script may include instructions for inserting code into portions of the template indicated by a placeholder to generate code that may be used to present a requested webpage. In some implementations, the script may be provided to the client device if it is determined that the client device does not currently store the script or is currently storing a previous version of the script. If the client device currently stores the most recent version of the script, the response may omit inclusion of the script to reduce the amount of data sent to the client device.

In some cases, a template may be associated with an expiration time, such as a specific time or a length of time after the template is provided to the client device. After occurrence of the expiration time, the template may be deleted. In other cases, a template may be configured for deletion after the template has not been used for a selected length of time. For example, to prevent accumulation and storage of templates and template identifiers associated with templates that are no longer used, expiration times or other methods for expiring and deleting templates may be used. In other implementations, in response to a list of template identifiers included with the request from the client device, the server may determine correspondence between the template identifiers and expiration data that indicates templates that are no longer in use. Based on the correspondence, the server may include an instruction in the response that may cause the client device to delete data associated with stored templates that are no longer in use.

As one skilled in the art will appreciate in light of this disclosure, certain embodiments may be capable of achieving certain advantages. For example, use of a template stored in association with a client device to generate at least a portion of the webpage code for a webpage may significantly reduce the amount of data transferred to the client device. Reducing the amount of data transmitted from a server or other source of data to the client device may significantly decrease the latency associated with presentation of a webpage. This reduction in latency may be especially apparent when the client device is geographically remote from the location of the server or when network conditions result in a large amount of latency. Reducing the amount of data transmitted to a client device by using locally stored templates to generate at least a portion of a presented webpage may also decrease the computational resources used to prepare and transmit data, to receive data, and to process received data. Additionally, use of a template and received code to generate a webpage may improve the reliability of the presented webpage. For example, preparation of a webpage for presentation using a template and code received from a server may enable the webpage to be prepared for presentation locally, rather than attempting to render portions of the webpage as they are received from a remote server or other source of data. Additionally, implementations described in the present disclosure may be used in conjunction with other methods for reducing the data exchanged between a server and client device without interfering with the use of such methods. For example, a template and code used to generate a webpage in combination with a template may be transmitted using various methods of compression. As another example, in some cases, data that is used in combination with a template to generate a webpage may be retrieved from a cache associated with a Content Delivery Network (CDN) or a cache associated with a browser or other application associated with a client device. For example, a template may include HTML code indicating the location or other properties of an image box that is common to multiple webpages, while a browser cache may store data associated with a particular image that may be presented in the image box.

FIG. 1 depicts an implementation of a system 100 for generating a webpage or other type of user interface based in part on one or more templates 102(1) stored in association with a client device 104. A client device 104 may include any type of computing device including, without limitation, a portable computing device such as a laptop computing device, tablet computing device, smartphone, or wearable computing device, a desktop computing device, an automotive computing device, a set top box, a server, and so forth. The client device 104 may include various input devices, such as a keyboard, touch sensor, mouse device, and so forth, which may receive user input to generate a request 106 to access a webpage. For example, a user may provide input to a keyboard or touch sensor to enter a uniform resource locator (URL) or other information indicative of a webpage. The client device 104 may also include various output devices, such as a display device, one or more speakers, haptic devices, and so forth, which may be used to present a webpage. The client device 104 may additionally include data storage that stores one or more templates 102(1) and various applications and other data, such as a browser application that may be used to generate requests 106 and present webpages based in part on responses 108 received from a server 110 or other source of code or other data used to generate the webpage.

As described previously, a template 102 may include a first portion of code, such as HTML code, XML code, or other types of data or metadata that may be used to generate a webpage or other type of user interface. For example, FIG. 1 depicts the client device 104 storing three example templates 102, labeled "A", "B", and "C". As one example, the template 102 labeled "C" is shown including first template code 112(1) and second template code 112(2). The template 102 is also shown including a placeholder 114. The template code 112 may represent HTML code or other types of code that is common to multiple webpages. For example, multiple webpages associated with presentation of information regarding items available for purchase may each be generated using common HTML code, represented by the template code 112. Continuing the example, the template code 112 may correspond to static elements, such as headers, logos, borders, and navigational interfaces that are present on each webpage. Additionally, template code 112 may correspond to portions of elements. For example, template code 112 may correspond to the location of an image box, a text box, or another type of container, but may not necessarily include a reference to an image, text, or other content associated with the container. As such, in the absence of additional code, the template code 112 may not necessarily be usable to generate a webpage. For example, the template code 112 may include one or more incomplete webpage elements that may be completed by inserting additional code in place of the placeholder 114. While FIG. 1 depicts an example template 102 that includes two portions of template code 112 and a single placeholder 114, a template 102 may include any amount of template code 112 and any number of placeholders 114. Additionally, while FIG. 1 depicts the client device 104 storing three example templates 102(1), any number of templates 102 may be used.

To access a webpage, the client device 104 may provide a request 106 indicative of the webpage to one or more servers 110. The server(s) 110 may include any type of computing device including, without limitation, the computing devices described with regard to the client device 104. While FIG. 1 depicts a single server 110, the server(s) 110 may include any number and any type of computing devices. The request 106 may include a webpage identifier 116 indicative of the webpage to which access is requested. For example, the webpage identifier 116 may include a URL or other type of identifier that may be used to differentiate a particular webpage from other webpages. The request 106 may also include device information 118 indicative of the client device 104. The device information 118 may include information such as an IP address, a MAC address, or other types of identifiers that may be used to differentiate the client device 104 from other computing devices. The device information 118 may also include information indicative of hardware or software components of the client device 104 or other characteristics of the client device 104, or an indication of a user or user account associated with the client device 104. For example, the hardware and software components of a client device 104 may be used to determine whether the client device 104 is capable of executing scripts or performing other functions to generate webpages using a template 102(1). In some implementations, the device information 118 may include an indication of a geographic location of the client device 104. In other cases, at least a portion of the device information 118, such as an IP address or information associated with a user account, may be used to determine a geographic location associated with the client device 104. In some implementations, the device information 118 may include an indication of one or more networks associated with the client device 104 or transmission of the request 106, or one or more metric values associated with the exchange of data with the client device 104. In other cases, metric values associated with communication with the client device 104 may be determined by the server(s) 110. The request 106 may also include a set of template identifiers 120(1) indicative of the templates 102(1) stored in association with the client device 104. As described previously, in some implementations, a template identifier 120 may include a hash code or other unique alphanumeric string that may be used to differentiate a particular template 102 from other templates 102. Transmission of a template identifier 120 of limited size, such as a hash code, may reduce the amount of data exchanged between the client device 104 and the server(s) 110. In some implementations, the template identifier(s) 120(1) may be transmitted as a cookie or other type of data associated with the request 106. For example, the template identifier(s) 120(1) may be transmitted as a list, such as a list of hash codes delineated by separators.

A template determination module 122 associated with the server(s) 110 may determine the template 102 associated with the requested webpage. For example, based on the webpage identifier 116 of the request 106 and webpage data 124 that associates data for generation of webpages with associated webpage identifiers 116, the particular webpage associated with the request 106 may be identified. The template determination module 122 or another module associated with the server(s) 110 may then determine the code associated with the requested webpage, such as by generating the webpage. The template 102 associated with the webpage may then be determined by comparing the code associated with the webpage with each of the templates 102(2) stored in association with the server(s) 110. For example, if a particular template 102 includes template code 112 that is not included in the code associated with the webpage, then the template 102 may not correspond to the webpage. However, if the template code 112 for a particular template 102 matches the code for the webpage, the template 102 may be determined to correspond to the webpage. For example, the template 102 may be usable to generate the webpage by inserting additional code in place of one or more placeholders 114 within the template 102, then using the template code 112 and the inserted code to generate the webpage. The template determination module 122 may generate a template determination 126 indicative of a particular template 102 that corresponds to the requested webpage.

A response determination module 128 associated with the server(s) 110 may determine whether the template 102 indicated in the template determination 126 matches the templates 102 indicated by the template identifiers 120(1) of the request 106. Based on this determination, a response that includes the determined template 102 or omits the determined template 102 may be generated. For example, as shown in FIG. 1, the template determination 126 indicates that the requested webpage corresponds to the template 102 labeled "C". Continuing the example, the client device 104 is depicted storing the templates 102(1) labeled "A", "B", and "C" and providing template identifiers 120(1) indicative of these three templates 102(1). Based on the template determination 126 from the template determination module 122 and the template identifiers 120(1) indicated in the request 106, the response determination module 128 may generate a response determination 130 indicating that the determined template 102 is stored in association with the client device 104.

A response generation module 132 associated with the server(s) 110 may generate a response 108 based on the response determination 130, the webpage data 124, and the template 102 associated with the webpage. For example, based on a response determination 130 indicating that the client device 104 has currently stored the template 102 associated with the webpage, the response generation module 132 may determine additional code 134 based on the code associated with the entire webpage and the code associated with the template 102. For example, the additional code 134 may represent the difference between the code associated with the webpage and the template 102. Continuing the example, the additional code 134 may be generated by removing at least a portion of the template code 112 from the code for the entire webpage. The response 108 may include the determined additional code 134 and a template identifier 120(2) indicative of the template 102 indicated in the template determination 126. For example, FIG. 1 depicts the response 108 including a template identifier 120(2) indicative of the template 102 labeled "C" and additional code 134 that may be used to generate the requested webpage by inserting the additional code 134 in place of the placeholder 114 in the template 102. The response generation module 132 or another module associated with the server(s) 110 may provide the response 108 to the client device 104.

Based on the response 108, the client device 104 may generate webpage code 136 used to present the webpage. For example, based on the template identifier 120(2) of the response 108, the client device 104 may access the associated template 102 and execute a script. The script may cause the client device 104 to generate the webpage code 136 by inserting the additional code 134 in place of the placeholder 114 of the template 102. The client device 104 may then present the webpage based on the webpage code 136. By determining that the template 102 associated with the requested webpage is stored in association with the client device 104 a response 108 that includes only a template identifier 120(2) and the additional code 134 may be generated. Such a response 108 may include a much smaller quantity of data when compared to a response 108 that includes the code associated with the entire webpage. As a result, the response 108 shown in FIG. 1 may be transmitted with significantly less latency and computational resources when compared to a response 108 that includes the code associated with the entire webpage. Additionally, in some implementations, a single template 102 may correspond to multiple webpages. For example, multiple webpages of a similar type within a single website may share common HTML code, XML code, or other types of data or metadata, represented by a template 102. A request 106 to access any of the webpages associated with the template 102 may be used to generate a response 108 that includes only the additional code 134 not included in the template 102, significantly reducing the quantity of data sent from the server(s) 110 to the client device 104.

In some implementations, the server(s) 110 may include a device characteristic module 138. The device characteristic module 138 may determine, based in part on the device information 118 associated with the request 106, whether the client device 104 is capable of executing scripts or performing other functions to generate the webpage code 136 based on the determined template 102(1). In some implementations, the device characteristic module 138 may access data indicative of characteristics of the client device 104 stored in association with the server(s) 110. In other implementations, the capabilities of the client device 104 may be determined based on the device information 118 of the request 106 or other data received from the client device 104. In some implementations, the device characteristic module 138 may also determine a geographic location associated with the client device 104. The device characteristic module 138 may generate a compatibility determination 140 indicative of whether the client device 104 is capable of generating webpage code 136 using a template 102(1) and in some cases, whether the location of the client device 104 corresponds to one or more threshold locations. If the client device 104 is capable of generating webpage code 136 using a template 102(1) and is located within a threshold distance of one or more threshold locations, the response 108 described with regard to FIG. 1 may be generated and provided to the client device 104. If the client device 104 is incapable of generating the webpage code 136 using the template 102(1) or is not located proximate to a threshold location, the response 108 may instead include the webpage code 136 rather than the template identifier 120(2).

Figure 2:
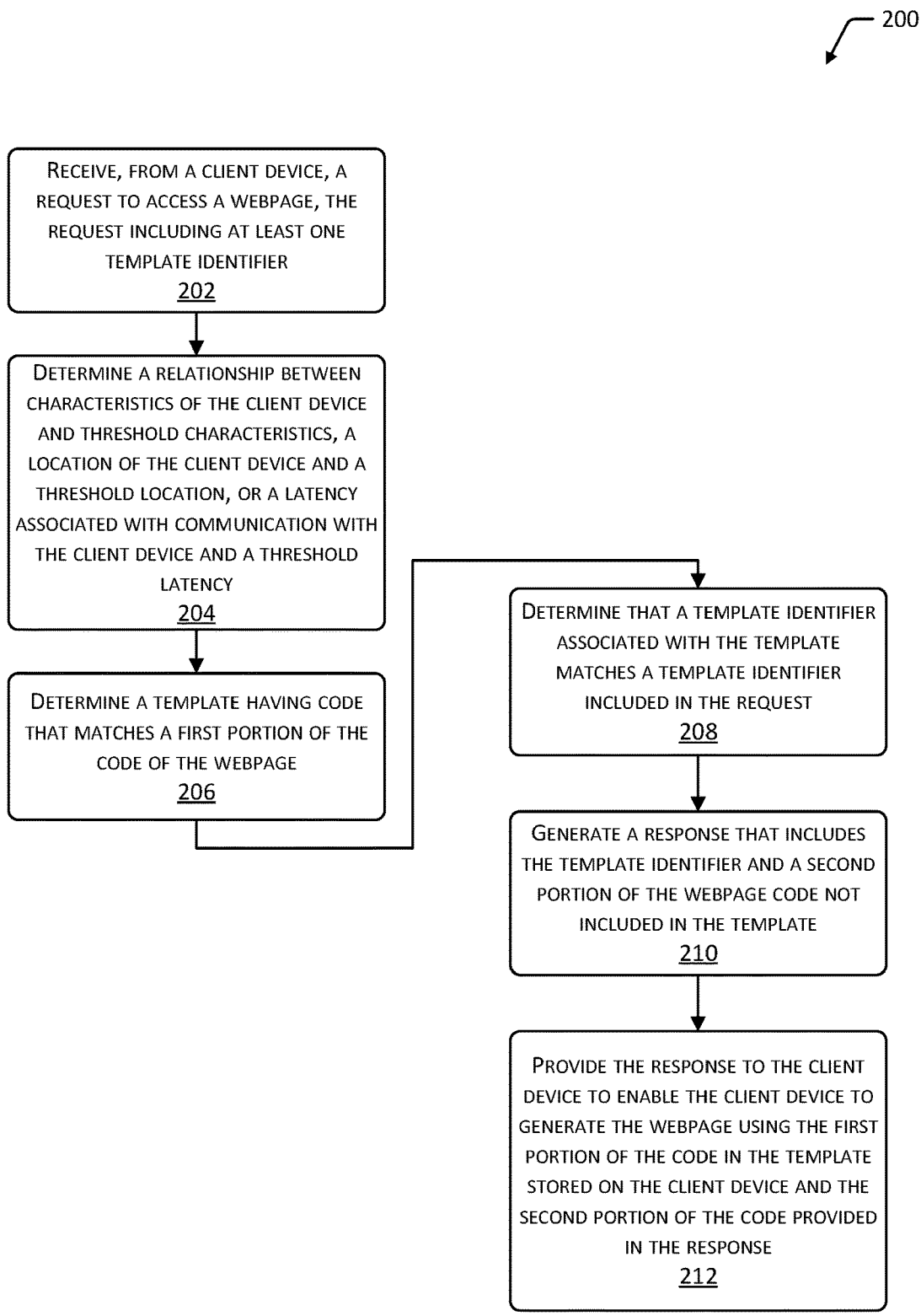
FIG. 2 is a flow diagram depicting an implementation of a method for generating a webpage or other type of user interface based in part on a template stored in association with a client device.

FIG. 2 is a flow diagram 200 depicting an implementation of a method for generating a webpage or other type of user interface based in part on a template 102 stored in association with a client device 104. At 202, a request 106 to access a webpage may be received from a client device 104. The request 106 may include at least one template identifier 120. For example, as described with regard to FIG. 1, a client device 104 may have one or more templates 102 stored in association therewith. Each template may include a first portion of the webpage code associated with one or more webpages. For example, a particular template 102 may include code that is common to multiple webpages, such as HTML code that corresponds to static elements, the layout or other characteristics of particular containers, and so forth. When a client device 104 provides a request 106 to access a webpage, the client device 104 may also provide an indication of the template(s) 102 stored in association with the client device 104, which may enable the server(s) 110 or other computing devices that receive the request 106 to determine whether transmission of code corresponding to a determined template 102 is necessary to enable the client device 104 to present the webpage.

At 204, a relationship between characteristics of the client device 104 and threshold characteristics, between a location of the client device 104 and a threshold location, or between a latency associated with communication with the client device and a threshold latency may be determined. For example, if the characteristics of the client device 104 deviate from a set of threshold characteristics indicating that the client device 104 is capable of generating webpage code 136 using a template 102, the client device 104 is geographically proximate to the server(s) 110 that provide data associated with the webpage, or if latency associated with communication between the client device 104 and the server(s) 110 is low, use of a template 102 may be unnecessary, and the server(s) 110 may provide the webpage code 136 for the entire webpage to the client device 102. However, if the client device 104 is capable of generating webpage code 136 using a template 102, and the client device 104 is geographically remote from the server(s) 110 or latency associated with communication between the client device 104 and server(s) 110 exceeds a threshold value, use of a template 102 may reduce the amount of data included in a response 108, thereby reducing the latency associated with providing the response 108 to the client device 104.

At 206, a template 102 having code that matches a first portion of the code of the webpage 102 may be determined. In some implementations, the server(s) 110 or other source of data associated with the webpage may generate the webpage or otherwise determine the webpage code 136 associated with the webpage. The webpage code 136 may then be compared to the code associated with multiple templates 102 stored in association with the server(s) 110. If the code for a template 102 matches at least a portion of the code associated with a webpage, and the template 102 does not include code that does not match the webpage, the template 102 may correspond to the requested webpage. For example, a corresponding template 102 may include template code 112 that matches portions of the webpage code 136 associated with static elements, the layout of various dynamic elements, and so forth. The template 102 may also include one or more placeholders 114. The webpage code 136 for a particular webpage may be generated by inserting additional code 134 from the server(s) 110 in place of the placeholders 114.

At 208, a determination may be made that a template identifier 120 associated with the template 102 matches a template identifier 120 included in the request 106. For example, the request 106 may include a cookie or other type of data that contains a list or other data structure presenting template identifiers 120. The template identifiers 120 included in the request 106 may indicate the templates 102 that are stored in association with the client device 104. As such, if a template identifier 120 included in the request 106 matches the template identifier 120 for the determined template 102, this may indicate that the determined template 102 is locally stored on the client device 104 or stored in data storage that is accessible to the client device 104. In such a case, a response 108 provided to the client device 104 may omit code included in the template 102 to reduce the amount of data sent to the client device 108. Conversely, if the template identifier 120 for the determined template 102 does not match the template identifier(s) 120 included in the request 106, a response 108 that includes the webpage code 136 for the entire webpage, including the code in the template 102, may be generated and provided to the client device 104.

At 210, in response to a determination that the template identifier 120 associated with the template 102 is included in the request 106, a response 108 may be generated. The response 108 may include the template identifier 120 and a second portion of the webpage code 136 not included in the template 102. For example, as described with regard to FIG. 1, the response 108 may include additional code 134 not included in the template 102, such as code that may be inserted in place of a placeholder 114 in the template 102 to generate the webpage code 136. In some implementations, the additional code 134 included in the response 108 may be determined by determining a difference between the webpage code 136 for the webpage and the template code 112 included in the template 102.

At 212, the response 108 may be provided to the client device 104 to enable the client device 104 to generate the webpage. The client device 104 may generate the webpage using the first portion of the code in the template 102 stored on the client device 104 (e.g., the template code 112) and the second portion of the code provided in the response 108. For example, the client device 104 may determine the stored template 102 that corresponds to the webpage based on the template identifier 120 included in the response 108. In some implementations, the client device 104 may execute a script provided by the server(s) 110 or that was previously stored on the client device 104, to insert at least a portion of the additional code 134 in the response 108 into the template 102 at locations corresponding to one or more placeholders 114. Using the template 102 and the response 108, the client device 104 may generate webpage code 136, which may be used to present the webpage.

Figure 3:
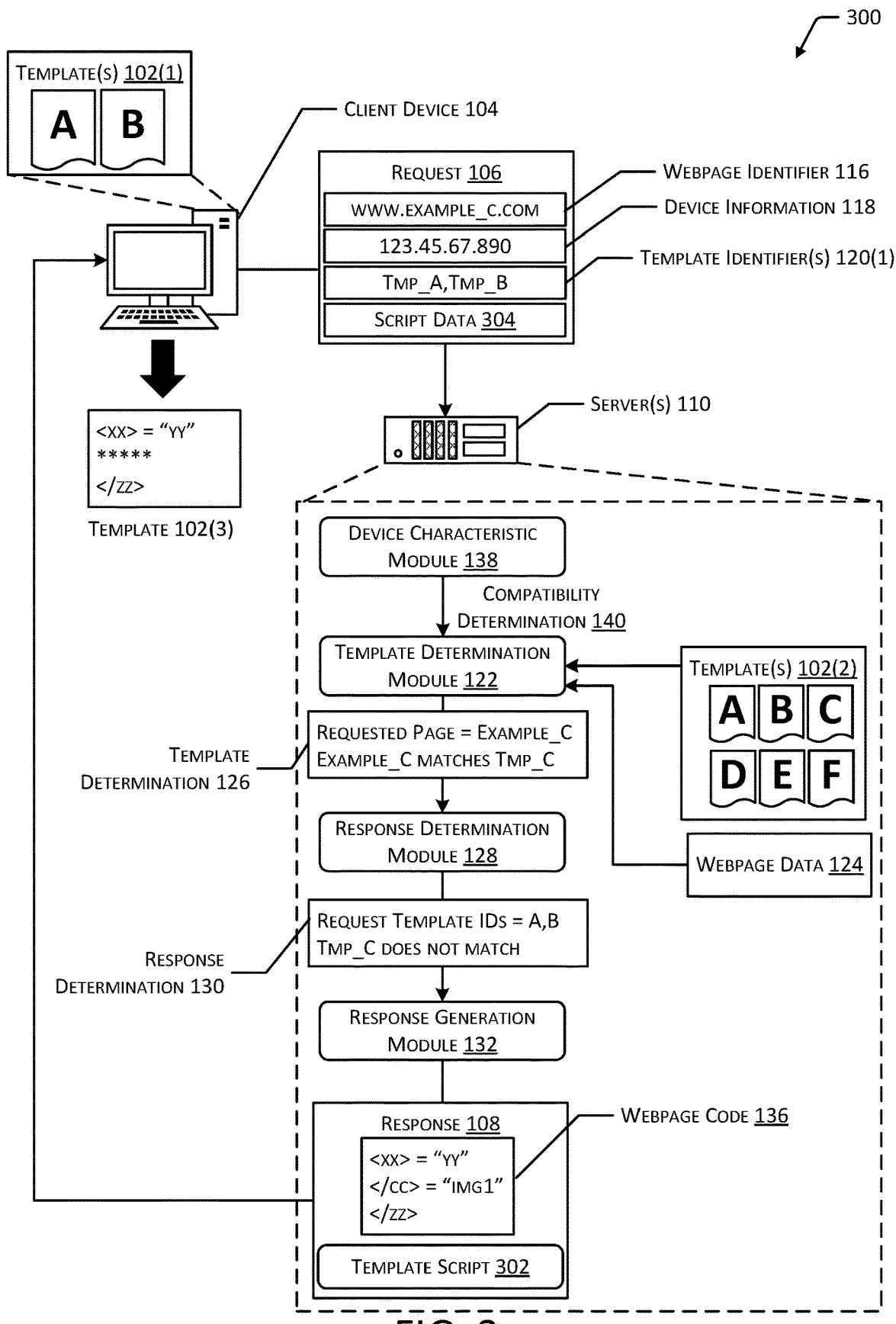
FIG. 3 depicts an implementation of a system for generating a webpage or other type of user interface based in part on webpage code, and generating a template for future use based on the webpage code.

FIG. 3 depicts an implementation of a system 300 for generating a webpage or other type of user interface based in part on webpage code 136, and generating a template 102 for future use based on the webpage code 136. As described with regard to FIG. 1, a client device 104 may store one or more templates 102(1), each template 102 including a portion of the code used to generate one or more webpages. For example, a template 102 may include template code 112 associated with static elements, code associated with the location or other characteristics of dynamic elements, and other types of code that are common to multiple webpages. A template 102 may also include one or more placeholders 114, which may be replaced with additional code 134 to generate webpage code 136 for presentation of a webpage. FIG. 3 depicts the client device 104 storing two templates 102(1) labeled "A" and "B". Each template 102 may correspond to multiple webpages. For example, a first webpage may be generated using the template code 112 from the template 102 labeled "A" and a first additional code 134 from the server(s) 110, while a second webpage may be generated using the same template code 112, but different additional code 134.

As described with regard to FIGS. 1 and 2, the client device 104 may provide a request 106 to access a webpage, or other type of user interface, to the server(s) 110, or another source of data. The request 106 may include a webpage identifier 116 indicative of the webpage to which access is requested, device information 118 indicative of various characteristics of the client device 104, such as a location of the client device 104, and template identifiers 120(1) indicative of the templates 102(1) stored in association with the client device 104. For example, FIG. 3 depicts the template identifiers 120(1) included with the request 106 indicating the templates 102(1) labeled "A" and "B".

As described with regard to FIG. 1, in some implementations, a device characteristic module 138 associated with the server(s) 110 may generate a compatibility determination 140 indicative of whether the client device 104 is capable of using templates 102 to generate webpage code 136, determining templates 102 from received webpage code 136, executing scripts to perform such functions, and so forth. In other implementations, the compatibility determination 140 may indicate a relationship between a location of the client device 104 and one or more threshold locations. If the compatibility determination 140 indicates a lack of functionality of the client device 104 or a location that deviates from one or more threshold locations, use of templates 102 and scripts may be omitted. If the compatibility determination 140 indicates that the client device 104 is capable of using templates 102 to generate webpage code 136, determining templates 102 from received webpage code 136, and executing scripts to perform such functions, and the location of the client device 104 corresponds to one or more threshold locations, the functions described with regard to FIGS. 1-3 may be performed.

The template determination module 122 associated with the server(s) 110 may generate a template determination 126 based on the webpage identifier 116 of the request 106, webpage data 124, and templates 102(2) stored in association with the server(s) 110. For example, the webpage data 124 may indicate a particular webpage that corresponds to the webpage identifier 116. The template determination module 122, or another module associated with the server(s) 110, may generate the requested webpage or otherwise determine the webpage code 136 associated with the webpage. The template determination module 122 may then determine a particular template 102 having a template code 112 that matches at least a portion of the webpage code 136 of the webpage. For example, FIG. 3 depicts a template determination 126 indicating that the template 102 labeled "C" includes code that matches the code of the requested webpage.

The response determination module 128 associated with the server(s) 110 may generate a response determination 130 based on the template identifier(s) 120(1) included with the request 106 and the template determination 126. For example, as shown in FIG. 3, the client device 104 does not store the template 102 labeled "C". As such, the response determination 130 indicates that the template 102 labeled "C" indicated by the template determination 126 does not match the template identifier(s) 120(1) included in the request 106. As such, transmitting additional code 134 associated with the requested webpage in the absence of the corresponding template 102 would not enable the client device 104 to generate the webpage.

The response generation module 132 associated with the server(s) 110 may generate a response 108 based on the response determination 130. Based on the response determination 130 indicating that the client device 104 does not store the template 102 associated with the requested webpage, the response 108 may include the webpage code 136 associated with generation of the webpage. The webpage code 136 may include both the template code 112 that is associated with the corresponding template 102 and additional code 134 that may be inserted in place of a placeholder 114 in the template 102. In some implementations, the response 108 may also include a template script 302 that may be used by the client device 104 to generate the associated template 102(3) based on the webpage code 136. In some cases, the template script 302 may also be used at subsequent times to generate webpage data 136 using a template 102 and additional data 134 from the server(s) 110. For example, the response generation module 132 or another module associated with the server(s) 110 may determine that the client device 104 does not currently store the template script 302 or currently stores a previous version of the template script 302. In some implementations, the request 106 may include script data 304 indicative of a version or other characteristics of the template script 302 currently stored by the client device 104. In such a case, if the client device 104 does not store a current version of the template script 302, the current version of the template script 302 may be included with the response 108. However, if it is determined that the client device 104 currently stores the most recent version of the template script 302, the template script 302 may not be included with the response 108 to reduce the amount of data provided from the server(s) 110 to the client device 104. In still other implementations, inclusion of the template script 302 with the response 108 may be determined based on metric values associated with communication between the client device 104 and server(s) 110. For example, if it is determined that the client device 104 currently stores a previous version of the template script 302, but latency associated with communication between the server(s) 110 and client device 104 is greater than a threshold value, a current version of the template script 302 may not be included in the response 108 and the client device 104 may use the version of the template script 302 that is currently stored.

Using the webpage code 136 of the response 108, the client device 104 may present the associated webpage. Additionally, using the webpage code 136 and the template script 302, the client device 104 may generate the template 102(3) associated with the webpage. For example, portions of the webpage code 136 that are included in the template 102(3) may include flags, markers, metadata, or other indications that the portions of the webpage code 136 correspond to template code 112. Other portions of the webpage code 136 not associated with the template 102(3) may lack such indications or may include other indications that the code is not associated with the template 102(3). The template script 302 may cause the client device 104 to determine the portions of the webpage code 136 that correspond to template code 112 and generate the template 102(3) based on the determined template code 112. The template 102(3) may be stored for subsequent use by the client device 104. For example, if a request 106 to access the same webpage or a different webpage associated with the same template 102(3) is provided to the server(s) 110, the request 106 may include an indication of a template identifier 120 for the template 102(3). In such a case, the response 108 may include the associated template identifier 120 and additional code 134 for use with the template 102(3), rather than the webpage code 136 for the entire requested webpage.

Figure 4:
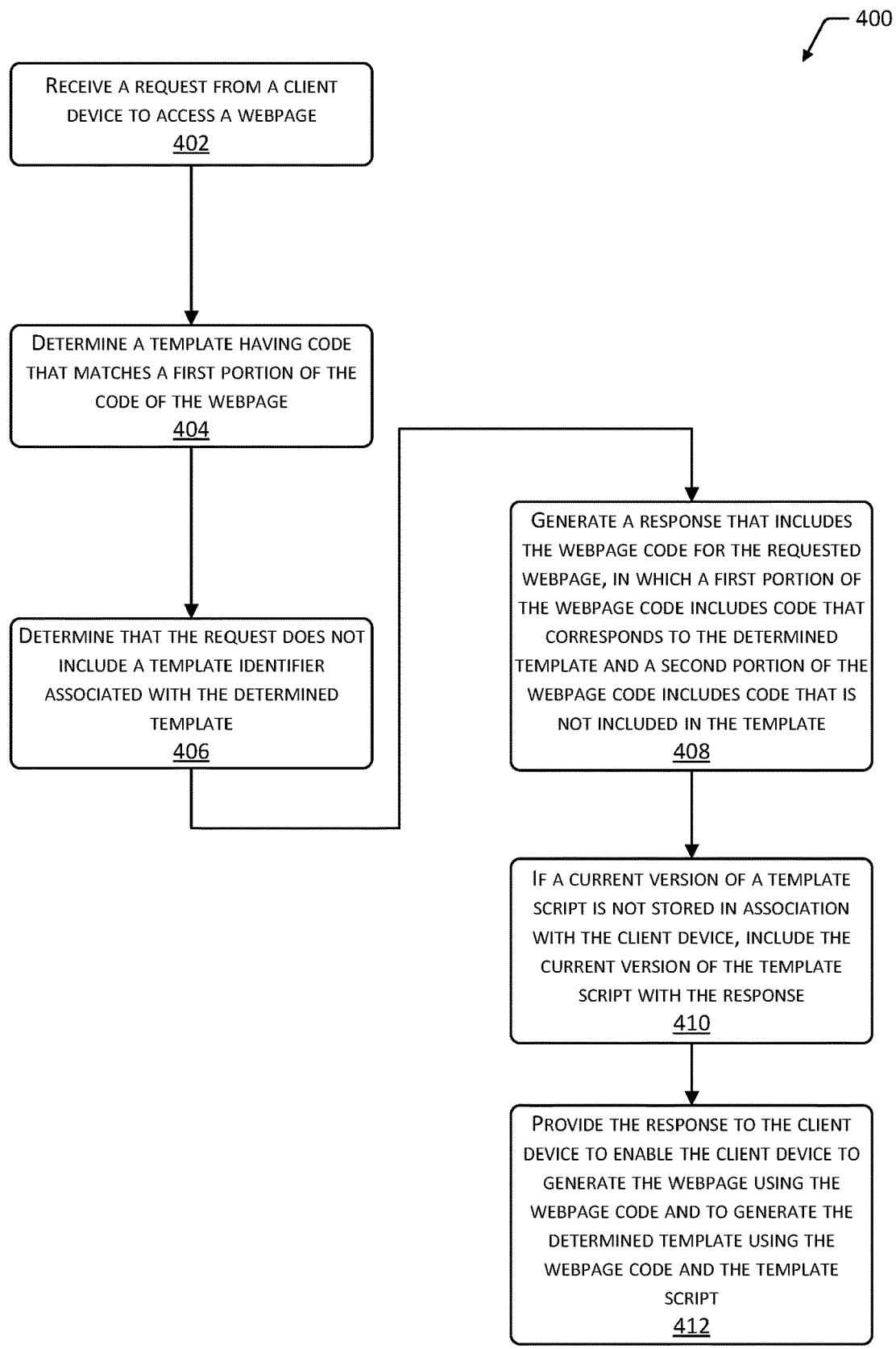
FIG. 4 is a flow diagram depicting an implementation of a method for generating a webpage or other type of user interface based in part on webpage code, and generating a template for future use based on the webpage code.

FIG. 4 is a flow diagram 400 depicting an implementation of a method for generating a webpage or other type of user interface based in part on webpage code 136, and generating a template 102 for future use based on the webpage code 136. At 402, a request 106 from a client device 104 may be received. For example, a client device 104 may provide a request 106 to one or more server(s) 110 to access a webpage. As described with regard to FIGS. 1-3, the request 106 may include a webpage identifier 116 indicative of the webpage to which access is requested and device information 118 indicative of one or more characteristics of the client device 104. In some implementations, the request 106 may also include one or more template identifiers 120 indicative of templates 102 stored in association with the client device 104. In other implementations, if no templates 102 are stored in association with the client device 104 or if the client device 104 is not configured to provide template identifiers 120 with a request 106, the request may not include a template identifier 120.

In some implementations, as described with regard to FIG. 2, a relationship between a location of the client device 104 and a threshold location, or between a latency associated with communication with the client device 104 and a threshold latency may be determined. The type of response 108 provided to the client device 104 may be determined based in part on this relationship. In other implementations, such a determination may be omitted.

At 404, a template 102 having code that matches a first portion of the code for the requested webpage may be determined. For example, the webpage may be generated or webpage code 136 for the webpage may be accessed in another manner. The template code 112 for one or more templates 102 stored in association with the server(s) 110 may then be compared to the webpage code 136 of the webpage to determine a template 102 having code that matches the code of the webpage. For example, a template 102 that lacks template code 112 that is not included in the webpage code 136 may correspond to the requested webpage.

At 406, a determination may be made that the request 106 does not include a template identifier 120 associated with the determined template 102. For example, the request 106 may include template identifiers 120 associated with templates 102 other than the determined template 102, but the client device 104 may not currently store the determined template 102. In other cases, the request 106 may not include a template identifier 120.

At 408, based on the determination that the request does not include a template identifier 120 associated with the determined template 102, a response 108 may be generated. The response 108 may include the webpage code 136 for the requested webpage. A first portion of the webpage code 136 may include code that corresponds to the determined template 102 (e.g., template code 112 of the template 102). A second portion of the webpage code 136 may include code that is not included in the template 102, such as additional code 134 that may be used in place of a placeholder 114 of the template 102 to generate the webpage code 136.

At 410, if a current version of a template script 302 is not stored in association with the client device 104, a current version of the template script 302 may be included with the response 108. In some implementations, the request 106 may include script data 304 indicative of the template script 302 being stored on the client device 104, or the absence of the template script 302. For example, the template script 302 may be configured to cause the client device 104 to include an indication of the template script 302, and in some cases a version associated with the template script 302, when a request 106 is provided to the server(s) 110. In other implementations, the server(s) 110 may maintain a list or other data structure indicative of the client devices 104 to which template scripts 302 have been provided, and in some cases the versions associated with the template scripts 302. If a template script 302 has previously been provided to the client device 104, the response 108 may not include a template script 302 to reduce the amount of data sent to the client device 104. In some implementations, the template script 302 may be provided to the client device 104 asynchronously (e.g., separately) from the response 108. For example, in response to a modification to the template script 302 determined by the server(s) 110, or in response to a command or other user input, a modified version of the template script 302 may be provided to one or more client devices 104 independent of receipt of a request 106.

At 412, the response 108 may be provided to the client device 104 to enable the client device 104 to generate the webpage using the webpage code 136 included in the response 108. Based on the webpage code 136 and the template script 302, the client device 104 may also generate the template 102 that is associated with the webpage. For example, a portion of the webpage code 136 may correspond to template code 112 of the template 102. The portions of the webpage code 136 that correspond to the template code 112 may be associated with flags, markers, or metadata indicating the association between the portions of the webpage code 136 and the template 102. In other cases, portions of the webpage code 136 that are not associated with the template 102 may be associated with flags, markers, metadata, and so forth. The template script 302 may be used to generate a template 102 that includes the portions of the webpage code 136 that correspond to the template code 112, while omitting other portions of the webpage code 136. In some implementations, the template script 302 may also cause the generated template 102 to include a placeholder 114 in the template 102 at locations where webpage code 136 that does not correspond to the template code 112 was present. The template 102 may be stored in association with the client device 104 and may be used at subsequent times to generate webpage code 136 when access to a webpage that corresponds to the template 102 is requested. For example, as described with regard to FIGS. 1 and 2, a response 108 may include additional code 134 that may be used in combination with the template 102 to generate webpage code 136. After the template 102 is stored in association with the client device 104, the client device 104 may store a template identifier 120 indicative of the template 102, such that when the client device 104 provides a subsequent request 106 to the sever(s) 110, a template identifier 120 indicative of the stored template 102 may be included with the request 106.

Figure 5:
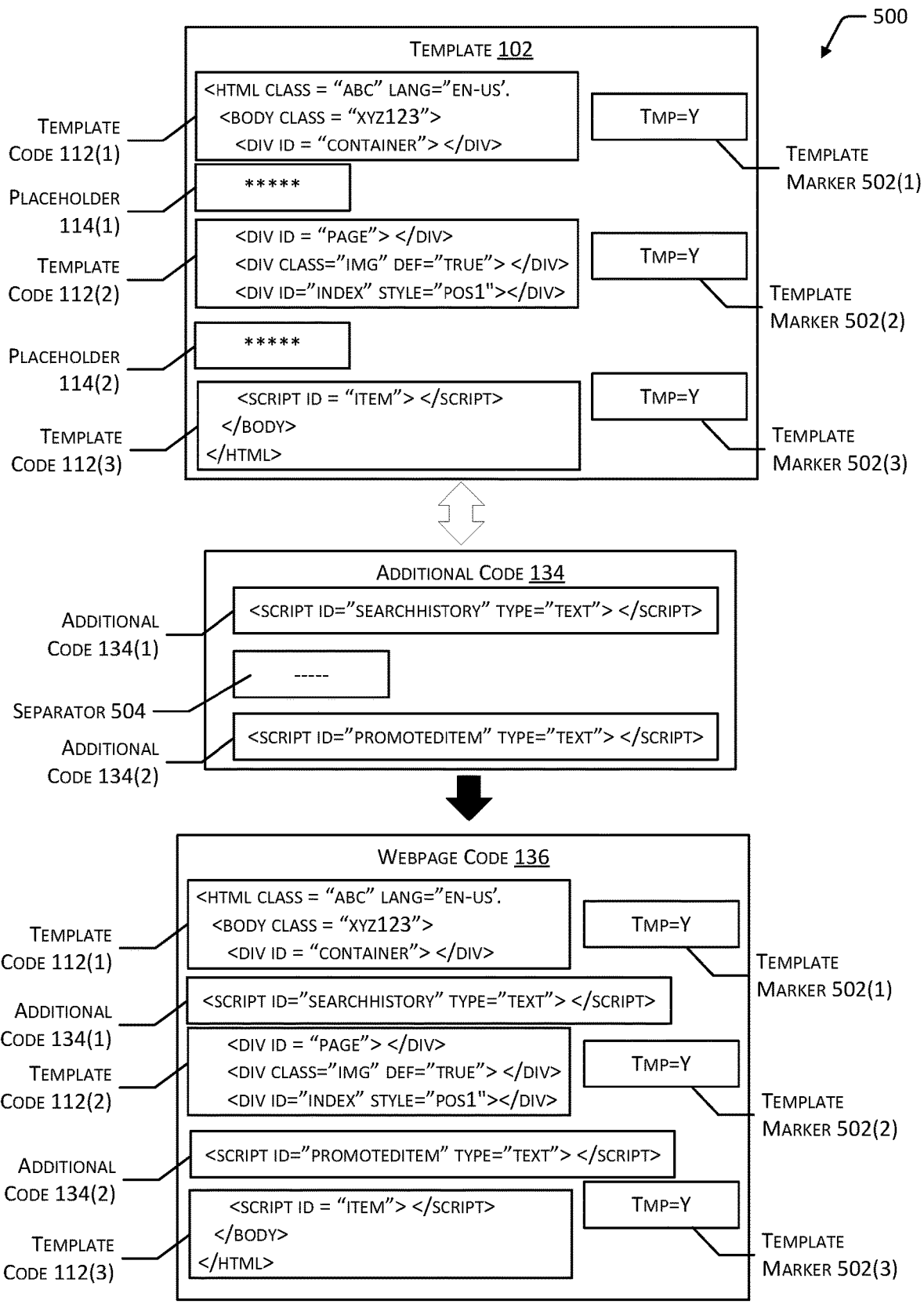
FIG. 5 is a block diagram illustrating example implementations of a template, additional code, and webpage code generated using the template and the additional code.

FIG. 5 is a block diagram 500 illustrating example implementations of a template 102, additional code 134, and webpage code 136 generated using the template 102 and the additional code 134. An example template 102 is shown that includes first template code 112(1), second template code 112(2), and third template code 112(3). Each section of template code 112 may correspond to HTML code, XML code, or other types of data or metadata that are common to multiple webpages. For example, template code 112 may correspond to static elements present in multiple webpages, portions of dynamic elements present in multiple webpages, such as placement, dimensions, or other characteristics of the dynamic elements, or other types of data common to multiple webpages. In some cases, template code 112 may include multiple nested elements and may include a significant portion of the total code of a webpage. For example, up to 40 percent of the webpage code 136 for a webpage may include template code 112. As such, using template code 112 from a locally-stored template 102 to generate a least a portion of the webpage code 136 for a webpage may significantly reduce the amount of data transmitted to a client device 104.

In some implementations, one or more sections of the template code 112 may be associated with corresponding template markers 502. A template marker 502 may include a flag, marker, or other type of data or metadata that may be used to differentiate template code 112 from other portions of the template 102. When webpage code 136 is generated using the template code 112, a section of template code 112 included in the webpage code 136 may remain associated with a corresponding template marker 502. The template marker 502 may enable portions of generated webpage code 136 that are associated with a template 102 to be differentiated from other portions of the webpage code 136. Using the template markers 502, a template script 302 or one or more modules associated with the client device 104 or server(s) 110 may generate a template 102 based on received webpage code 136. For example, a template script 302 may be configured to identify portions of the webpage code 136 associated with template markers 502 (e.g., template code 112) and store the identified portions of the webpage code 136 as a template 102. The template script 302 may also be configured to include a placeholder 114 within the template 102 at locations within the webpage code 136 where other code not associated with a template marker 502 was present. FIG. 5 depicts the first template code 112(1) associated with a first template marker 502(1), the second template code 112(2) associated with a second template marker 502(2), and the third template code 112(3) associated with a third template marker 502(3). In some implementations, each template marker 502 may be identical. In other implementations, one or more of the template markers 502 may differ from one or more other template markers 502.

FIG. 5 also depicts the template 102 including placeholders 114 at particular locations, such as locations between sections of template code 112. Specifically, the depicted template 102 includes a first placeholder 114(1) between the first template code 112(1) and the second template code 112(2) and a second placeholder 114(2) between the second template code 112(2) and the third template code 112(3). In some implementations, the placeholders 114 may be indicated in the template 102 using a particular character, set of characters, alphanumeric string, and so forth. Each placeholder 114 may represent a location in the template 102 where additional code 134 may be inserted, in place of the placeholder 114, to generate webpage code 136.

In some implementations, the template 102 may also include a template identifier 120 associated with the template 102. For example, the template identifier 120 may be included within the template 102 itself, such as embedded within HTML code of the template 102. In other cases, the template identifier 120 may be associated with the template 102 but not included within the template code 112.

An example of additional code 134 is shown including a first section of additional code 134(1) and a second section of additional code 134(2), separated by a separator 504. Each section of additional code 134 may be used to replace a corresponding placeholder 114 of the template 102 to generate webpage code 136. For example, the first section of additional code 134(1) may be inserted in place of the first placeholder 114(1) and the second section of additional code 134(2) may be inserted in place of the second placeholder 114(2) to generate webpage code 136. The separator 504 may be used to delineate between different sections of additional code 134. In some cases, the separator 504 may be omitted and the additional code 134 may include flags, markers, or other types of data or metadata to indicate the beginning or end of a section of additional code 134. In other cases, the sections of additional code 134 or the separator 504 may include a portion of the adjacent template code 112, such as a line of HTML or XML code that immediately precedes or immediately follows a section of additional code 134. When the portion of the template code 112 that is adjacent to a section of additional code 134 is determined, this may indicate that the portion of the additional code 134 associated with the placeholder 114 has been inserted, and that subsequent sections of additional code 134 may be inserted in place of subsequent placeholders 114 to generate the webpage code 136.

FIG. 5 depicts example webpage code 136 that may be generated based on the template 102 and additional code 134. The webpage code 136 is shown including the first section of template code 112(1) associated with the first template marker 502(1) and followed by the first section of additional code 134(1). The first section of additional code 134(1) is followed by the second section of template code 112(2), which is associated with the second template marker 502(2). The second section of template code 112(2) is followed by the second section of additional code 134(2), which is followed by the third section of template code 112(3) that is associated with the third template marker 502(3). As described previously, a template 102 may be generated based on the webpage code 136 by determining portions of the webpage code 136 associated with template markers 502, including those portions of the webpage code 136 in the template 102, and inserting a placeholder 114 at each location where other portions of webpage code 136 are present. Additionally, as described previously, webpage code 136 may be generated based on a template 102 and additional code 134 by inserting a section of additional code 134(1) at each location where a placeholder 114(1) is included in the template 102.

Figure 6:
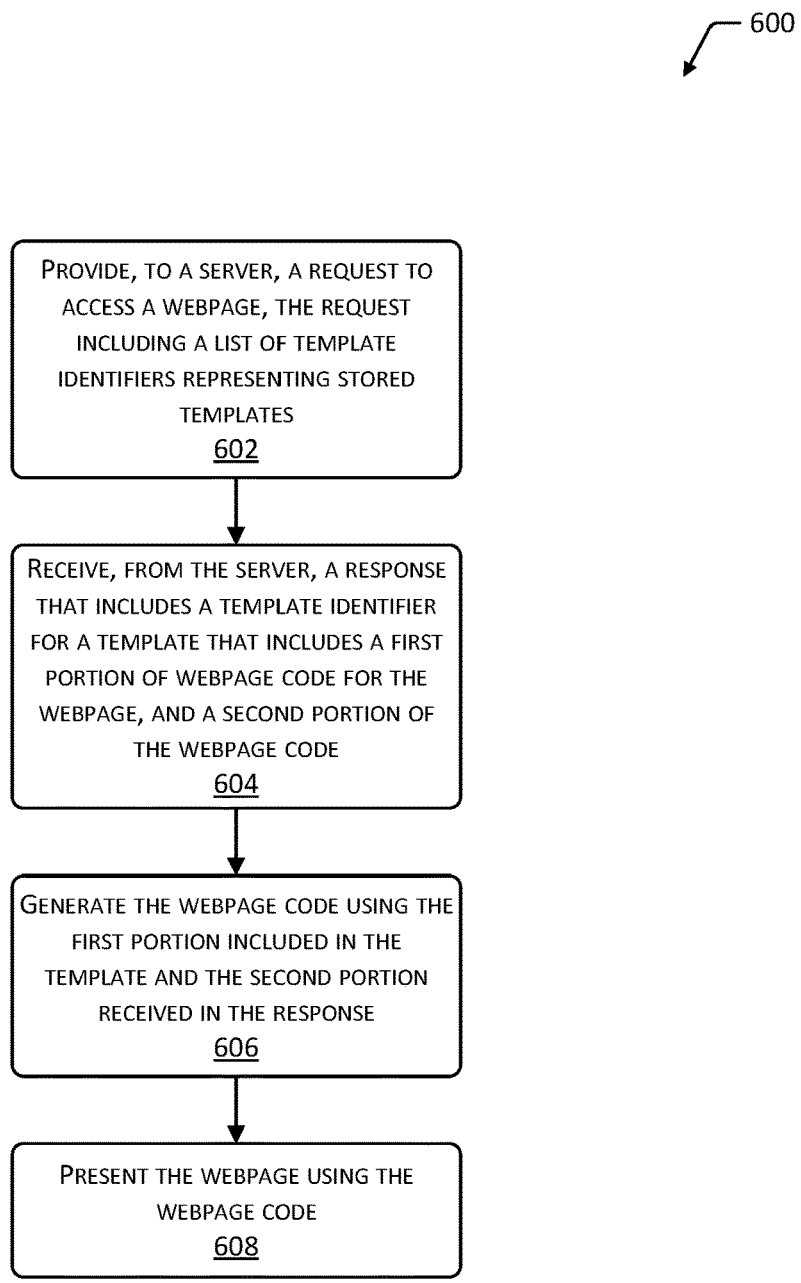
FIG. 6 is a flow diagram depicting an implementation of a method for generation of a webpage by a client device using a stored template and additional code received from one or more servers.

FIG. 6 is a flow diagram 600 depicting an implementation of a method for generation of a webpage by a client device 104 using a stored template 102 and additional code 134 received from one or more servers 110. At 602, a client device 104 may provide, to a server 110, a request 106 to access a webpage. The request may include a list of template identifiers 120 that represent templates 102 stored in association with the client device 104. For example, template identifiers 120 may include hash codes, names, or other alphanumeric strings that may be used to differentiate a particulate template 102 from other templates 102. The list of template identifiers 120 may include other types of data structures in addition to or in place of a list. In one implementation, the list of template identifiers 120 may include a hash code for each template 102 stored on the client device 104, separated by a comma or other type of separator.

At 604, a response 108 from the server 110 may be received. The response may include a template identifier 120 that matches a template identifier 120 indicated in the request 106. The template identifier 120 may be associated with a template 102 that includes a first portion of the webpage code 136 for the requested webpage. The response 108 may also include a second portion of the webpage code 136 for the webpage. For example, the template 102 may include template code 112 that is common to multiple webpages, such as code corresponding to static elements or the layout or other characteristics of dynamic elements. Additional code 134 from the server 110 may be inserted in place of one or more placeholders 114 in the template 102 to generate the webpage code 136 for a particular webpage. As such, a single template 102 may be used to generate webpage code 136 for multiple webpages, depending on the particular additional code 134 that is inserted in place of the placeholders 114.

At 606, the client device 104 may generate the webpage code 136 using the first portion of the code included in the template 102 and the second portion of the code received in the response 108. Then, at 608, the client device 104 may present the webpage using the webpage code 136. Use of the template 102 that is stored in association with the client device 104 to generate a portion of the webpage code 136 may reduce the amount of data transmitted from the sever 110 to the client device 104. Reducing the amount of data transmitted from the server 110 to the client device 104 may reduce the latency associated with presentation of the webpage and the computational resources used to prepare, transmit, receive, and process the data.

Figure 7:
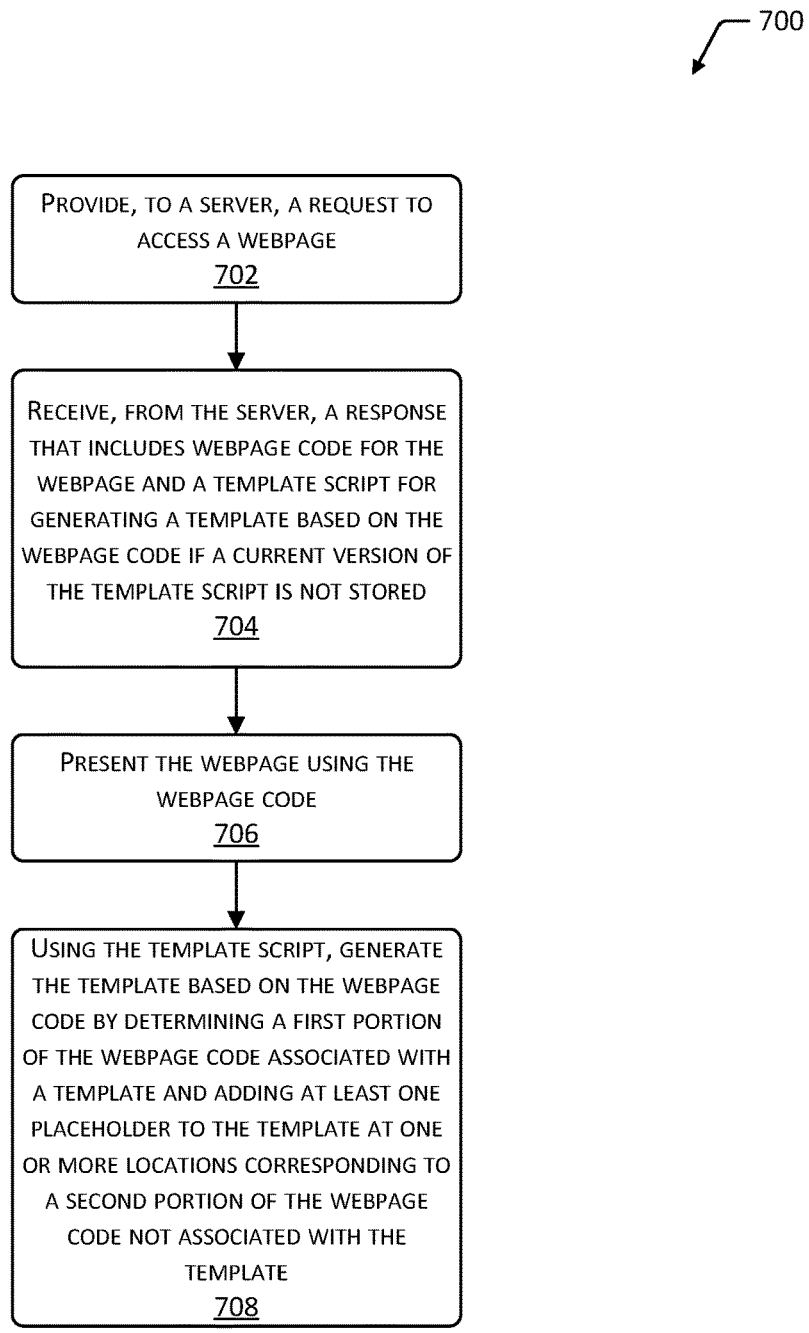
FIG. 7 is a flow diagram depicting an implementation of a method for generation of a webpage by a client device using webpage code, and generation of a template for future use based on the webpage code.

FIG. 7 is a flow diagram 700 depicting an implementation of a method for generation of a webpage by a client device 104 using webpage code 136, and generation of a template 102 for future use based on the webpage code 136. At 702, a client device 104 may provide, to a server 110, a request 106 to access a webpage. As described with regard to FIGS. 1-4, a request 106 may include a webpage identifier 116 indicative of the requested webpage, device information 118 indicative of characteristics of the client device 104 or a user account associated with the client device 104, and in some implementations, template identifiers 120 indicative of one or more templates 102 stored in association with the client device 104. If no template identifiers 120 are currently stored in association with the client device 104 or if the client device 104 is not configured to provide an indication of template identifiers 120 with a request 106, the request 106 may not include a template identifier 120. If the request 106 does not indicate a template identifier 120, or if the template identifiers 120 indicated in the request 106 do not match the template 102 associated with the requested webpage, the sever 110 may provide a response that includes the webpage code 136 rather than a template indicator 120.

For example, at 704, the client device 104 may receive a response 108 from the server 110. The response 108 may include the webpage code 136 for the webpage. In some implementations, the response 108 may include a template script 302 for generating a template 102 based on the webpage code 136. The template script 302 may be included with the response 108, or provided separately to the client device 104, if the client device 104 does not store a current version of the template script 302. If the client device 104 stores a current version of the template script 302, the response 108 may not include the template script 302, which may reduce the amount of data transmitted to the client device 104.

At 706, the client device 104 may present the webpage using the webpage code 136 received from the server 110. At 708, the client device 104 may use the template script 302 to generate the template 102 based on the webpage code 136. For example, a first portion of the webpage code 136 that is associated with the template 102 may be determined. Continuing the example, as described with regard to FIG. 5, webpage code 136 associated with a template 102 may include a template marker 502 or other indication. The portions of the webpage code 136 associated with a template marker 502 may be stored as template code 112 for the template 102. In some implementations, generation of the template 102 may also include inserting one or more placeholders 114 into the template 102 at locations that correspond to a second portion of the webpage code 136 that is not associated with the template 102. The template 102 may then be stored for future use, such as when a request 106 to access the same webpage or another webpage associated with the template 102 is provided to the server 110.

Figure 8:
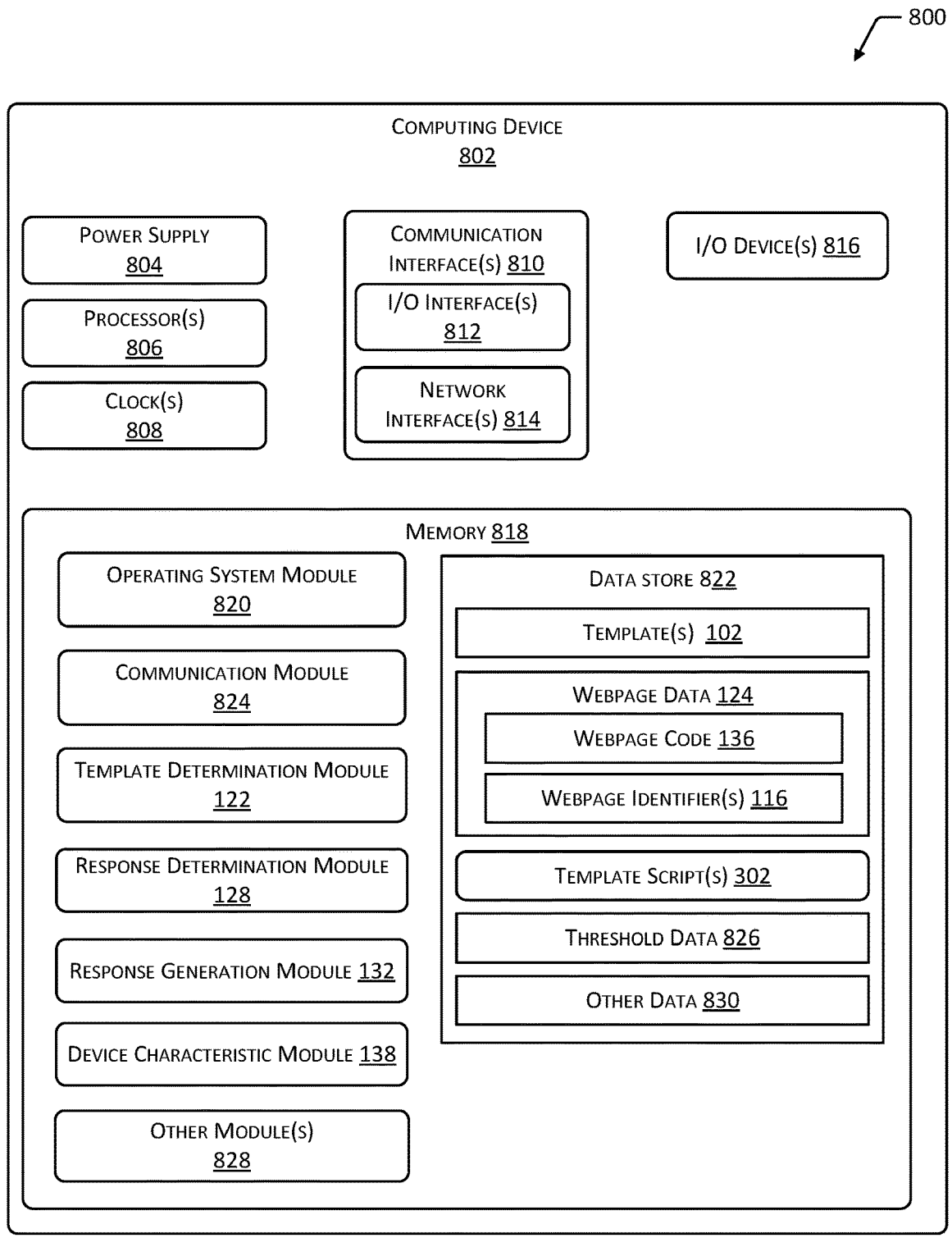
FIG. 8 is a block diagram illustrating an implementation of a computing device that may be used within the present disclosure.

FIG. 8 is a block diagram 800 illustrating an implementation of a computing device 802 that may be used within the present disclosure. The computing device 802 may include one or more servers 110, as shown in FIGS. 1 and 3. In some implementations, one or more functions described with regard to the computing device 802 may be performed by one or more client devices 104. For example, one or more servers 110 and a client device 104 may be used in combination to generate templates 102 based on webpage code 136, generate webpage code 136 based on templates 102, determine associations between webpages and templates 102, and so forth. Additionally, while FIG. 8 depicts a single block diagram 800 of a computing device 802, any number and any type of computing devices 802 may be used to perform the functions described herein.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clock(s) 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input devices or output devices associated with the computing device 802. For example, I/O devices 816 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 816 may be physically incorporated with the computing device 802. In other implementations, I/O devices 816 may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs (WLANs), wide area networks (WANs), wireless WANs, and so forth. For example, the network interfaces 814 may include devices compatible with Ethernet, Wi-Fi, Bluetooth, ZigBee, Z-Wave, 3G, 4G, 5G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 822 and one or more of the following modules may also be associated with the memory 818. The modules may be executed as foreground applications, background tasks, daemons, and so forth. The data store(s) 822 may use a flat file, database, linked list, tree, executable code, script, or other data structure to store information. In some implementations, the data store(s) 822 or a portion of the data store(s) 822 may be distributed across one or more other devices including other computing devices 802, network attached storage devices, and so forth.

A communication module 824 may be configured to establish communications with one or more other computing devices 802. Communications may be authenticated, encrypted, and so forth.

The memory 818 may also store the template determination module 122. The template determination module 122 may determine a webpage indicated in a request 106, such as by determining a webpage identifier 116 associated with the request. Based on webpage data 124 that associates webpage identifiers 116 with webpage code 136 for corresponding webpages, the template determination module 122 may determine the webpage code 136 associated with a requested webpage. Based on the webpage code 136 for the webpage, the template determination module 122 may determine a template 102 that corresponds to the webpage. In one implementation, the template determination module 122 may determine a particular template 102 having template code 112 that matches at least a portion of the webpage code 136 for the webpage, while not including any template code 112 that is not matched by the webpage code 136. In other implementations, a template 102 may correspond to a webpage if at least a threshold portion of the template code 112, indicated in threshold data 826, matches the webpage code 136, or if at least a threshold portion of the webpage code 136 matches the template code 112.

The memory 818 may also store the response determination module 128. The response determination module 128 may determine a template identifier 120 associated with the template 102 that matches the webpage code 136 for the webpage. The response determination module 128 may also determine the template identifiers 120 indicated in a request 106. The response determination module 128 may then determine whether the template identifier 120 for the requested webpage matches one of the template identifiers 120 indicated in the request 106 and may generate a response determination 130 indicative of the presence or absence of a matching template identifier 120.

The memory 818 may additionally store the response generation module 132. The response generation module 132 may generate a response 108 to be provided to a client device 104 requesting access to a webpage, based on the response determination 130. If the template identifier 120 for the requested webpage matches a template identifier 120 included in the request 106, the response 108 may include an indication of the template identifier 120 and additional code 134 that may be used in conjunction with the template 102, stored on the requesting client device 104, to generate webpage code 136 for the webpage. If the template identifier 120 for the requested webpage does not match a template identifier 120 included in the request 106, the response 108 may include the webpage code 136 for the webpage. The client device 104 may use the webpage code 136 to present the webpage. Additionally, the client device 104 may use a template script 302 to generate the template 102 based on the webpage code 136 so that when a subsequent request 106 to access a webpage associated with the template 102 is received, the template 102 that is stored in association with the client device 104 may be used. In some implementations, the response generation module 132 may determine whether the client device 104 has previously received a current version of the template script 302. If the client device 104 has not previously received a current version of the template script 302, the response 108 may include the template script 302. In other implementations, the template script 302 may be provided to the client device 104 separately, and in some cases, asynchronously, from the response 108.

The memory 818 may also store the device characteristic module 138. The device characteristic module 138 may determine, based in part on the device information 118 associated with the request 106 or device data indicative of characteristics of the computing device 802 providing the request 106, whether the requesting device is capable of executing scripts or performing other functions to generate the webpage code 136 based on a template 102 or generate a template 102 based on received webpage code 136. In some implementations, the device characteristic module 138 may also determine a geographic location associated with the requesting device. The device characteristic module 138 may generate a compatibility determination 140 indicative of whether the requesting device 104 is capable of generating webpage code 136 and templates 102, and in some cases, whether the location of the client device 104 corresponds to one or more threshold locations.

Other modules 828 may also be present in the memory 618. For example, other modules 828 may include modules for rendering or otherwise generating webpages or accessing webpage code 136 for webpages. Other modules 828 may include a module for determining a location of a client device 104 based on information included in a request 106 or stored data that includes information regarding the client device 104 or a user account associated with the client device 104. As described with regard to FIG. 2, a relationship between a geographic location associated with the client device 104 and one or more threshold locations, indicated in threshold data 826, may be used to determine whether a template 102 is used to generate a response 108 or whether the webpage code 136 is sent to the client device 104 without use of templates 102. Other modules 828 may include a module for determining metric values associated with communication with the client device 104, such as a latency value. As described with regard to FIG. 2, a relationship between a metric value and a threshold value, such as a threshold latency value indicated in threshold data 826, may be used to determine whether a template 102 is used to generate a response 108 or whether the webpage code 136 is sent to the client device 104 without use of templates 102. Other modules 828 may also include modules for determining expiration times associated with templates 102, determining whether template identifiers 120 included in a request 106 indicate one or more expired templates 102, or for causing a client device 104 to delete data associated with expired templates 102. Other modules 828 may also include encryption modules to encrypt and decrypt communications between computing devices 802, authentication modules to authenticate communications sent or received by computing devices 802, a permission module to assign, determine, and manage user permissions to access or modify data associated with computing devices 802, and so forth.

Other data 830 within the data store(s) 822 may include configurations, settings, preferences, and default values associated with computing devices 802. Other data 830 may also include encryption keys and schema, access credentials, and so forth. Other data 830 may also include network data indicative of networks accessible to one or more computing devices 802. Other data 830 may additionally include expiration data indicative of expired templates 102 that may be used to determine expired templates 102 stored in association with a client device 104 based on the template identifiers 120 included with a request 106.

In different implementations, different computing devices 802 may have different capabilities or capacities. For example, servers 110 may have greater processing capabilities or data storage capacity than client devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive, from a first device, a first request to access a first webpage, wherein the first request includes an indication of a first set of template identifiers indicative of one or more first templates accessible to the first device;
determine that the first webpage is associated with a first template identifier that is not included in the indication of the first set of template identifiers;
generate a first response that includes:
a first template associated with the first template identifier, wherein the first template includes first webpage code for generating a first portion of the first webpage; and
second webpage code for generating a second portion of the first webpage;
provide the first response to the first device;
receive, from the first device, a second request to access a second webpage, wherein the second request includes an indication of a second set of template identifiers indicative of one or more second templates accessible to the first device, and wherein the one or more second templates include the first template and the second set of template identifiers includes the first template identifier;
determine that the second webpage is associated with the first template identifier;
generate a second response that includes:
an indication of the first template identifier, wherein the first webpage code corresponds to a first portion of the second webpage; and
third webpage code for generating a second portion of the second webpage; and
provide the second response to the first device.

2. The system of claim 1, further comprising computer-executable instructions to:
include, in the first response, a script comprising instructions to cause the first device to:
generate the first template by identifying the first webpage code in the first response;
store the first template; and
generate the second webpage using the first template and the third webpage code.

3. The system of claim 1, further comprising computer-executable instructions to:
determine correspondence between the first webpage and a plurality of templates; and
determine, based on the correspondence, that the first webpage code of the first webpage matches the first webpage code of the first template, wherein the first webpage is determined to be associated with the first template identifier based on the correspondence.

4. A method comprising:
receiving, at a first time from a first device, a first request to access a first webpage, wherein the first request includes an indication of one or more templates that include a first template accessible to the first device;
determining that the first webpage is associated with the first template, wherein the first template includes first code that corresponds to a first portion of the first webpage and includes an indication of at least one location associated with additional code; and
providing a first response to the first device, wherein the first response includes an indication of the first template and second code for inclusion in the at least one location of the first template, and wherein the second code corresponds to a second portion of the first webpage.

5. The method of claim 4, further comprising:
receiving, from the first device, at a second time prior to the first time, a second request to access one or more of the first webpage or a second webpage;
determining that the one or more of the first webpage or the second webpage is associated with the first template, wherein the first code of the first template corresponds to a first portion of the second webpage; and
providing a second response to the first device, wherein the second response includes the first template and one or more of the second code or third code that corresponds to a second portion of the second webpage.

6. The method of claim 5, further comprising:
providing a script to the first device, wherein the script includes instructions to cause the first device to generate the first template by determining the first code included in the second response and to generate the first webpage based on the second code and the at least one location indicated in the first template.

7. The method of claim 5, wherein the second request includes an indication of one or more templates that do not include the first template, the method further comprising:
determining a lack of correspondence between the second request and the first template associated with the one or more of the first webpage or the second webpage, wherein the first template is included in the second response in response to the lack of correspondence.

8. The method of claim 5, further comprising:
including, in the second response, an expiration time associated with the first template, wherein subsequent to the expiration time, the first device is configured to delete data associated with the first template.

9. The method of claim 4, further comprising:
determining correspondence between one or more characteristics of the first device and one or more threshold characteristics, wherein the correspondence between the one or more characteristics and the one or more threshold characteristics indicates that the first device is capable of presenting the first webpage based on the first template;
determining one or more of a geographic location associated with the first device or a latency associated with the first device; and
determining correspondence between the one or more of the geographic location or the latency and one or more threshold values;
wherein the first template is included in the first response in response to the correspondence between the one or more of the geographic location or the latency and the one or more threshold values.

10. The method of claim 4, wherein the determining that the first webpage is associated with the first template includes determining correspondence between the first webpage and a plurality of templates, the correspondence indicating that the first code of the first template matches a portion of webpage code associated with the first webpage.

11. The method of claim 4, wherein the first request includes an indication of a plurality of templates, the method further comprising:

determining correspondence between the plurality of templates and expiration data indicative of a second template; and providing an instruction to the first device to cause the first device to delete data associated with the second template stored in association with the first device.

12. The method of claim 4, wherein the first code of the first template includes:

one or more of a location or a type associated with an element included in the first webpage; and a placeholder for content associated with the element, wherein the second code includes the element.

13. A system comprising:

one or more memories storing computer-executable instructions; and one or more hardware processors to execute the computer-executable instructions to:

receive, at a first time from a first device, a first request to access a first webpage;

determine that the first webpage is associated with a first template;

based on a lack of an indication of the first template in the first request, generate a first response that includes:

the first template, wherein the first template includes first code that corresponds to a first portion of the first webpage and an indication of at least one location associated with additional code;

second code for inclusion in the at least one location of the first template, wherein the second code corresponds to a second portion of the first webpage; and a first script that includes instructions to cause the first device to generate the first template by determining the first code included in the first response; and provide the first response to the first device.

14. The system of claim 13, further comprising computer-executable instructions to:

receive, from the first device, at a second time subsequent to the first time, a second request to access one or more of the first webpage or a second webpage, wherein the second request includes an indication of the first template;

determine that the one or more of the first webpage or the second webpage is associated with the first template, wherein the first code of the first template corresponds to a first portion of the second webpage;

based on correspondence between the second request and the first template, generate a second response that includes:

an indication of the first template; and one or more of the second code or third code that corresponds to a second portion of the second webpage; and provide the second response to the first device.

15. The system of claim 14, further comprising computer-executable instructions to:

at a third time subsequent to the second time, receive, from the first device, an indication that the first template is not stored in association with the first device; and in response to the indication that the first template is not stored in association with the first device, provide a third response that includes the first template to the first device.

16. The system of claim 14, further comprising computer-executable instructions to:

provide, to the first device, a second script that includes instructions to cause the first device to generate the one or more of the first webpage or the second webpage based on the first template and the second response.

17. The system of claim 13, further comprising computer-executable instructions to:

receive an indication of a second script from the first device; and determine that one or more of a time, a version, a characteristic, or content associated with the second script deviates from a threshold value indicative of the first script;

wherein the first script is included in the first response in response to the one or more of the time, the version, the characteristic, or the content deviating from the threshold value.

18. The system of claim 13, wherein the first request further includes a list of template identifiers, the system further comprising computer-executable instructions to:

determine a first template identifier associated with the first template; and determine a lack of correspondence between the first template identifier and the list of template identifiers;

wherein the first template is included in the first response in response to the lack of correspondence.

19. The system of claim 13, further comprising computer-executable instructions to:

determine a geographic location associated with the first device; and determine one or more of:

correspondence between the geographic location and one or more first threshold locations; or a difference between the geographic location and one or more second threshold locations;

wherein the first template is included in the first response in response to the one or more of the correspondence or the difference.

20. The system of claim 13, further comprising computer-executable instructions to:

determine one or more characteristics of the first device; and determine correspondence between the one or more characteristics and one or more threshold values, the correspondence indicating that the first device is capable of determining the first template from the first response;

wherein the first template is included in the first response in response to the correspondence.

* * * * *